Figure 1:
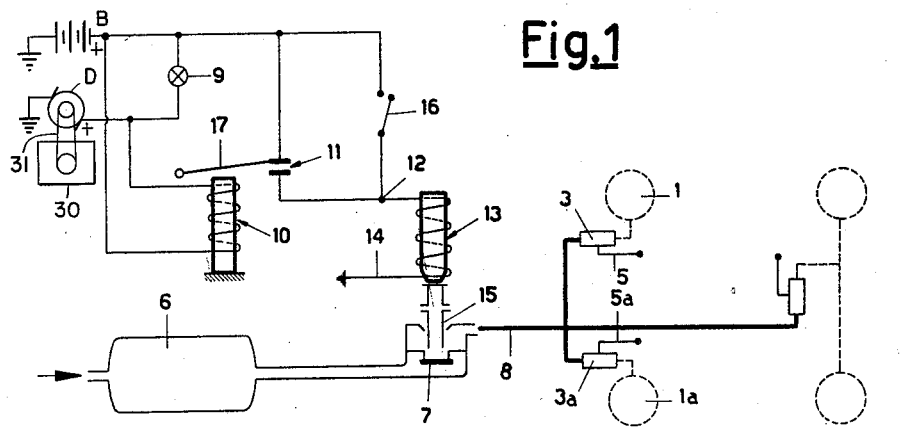

Oct. 30, 1962     G. ALFIERI     3,061,330

CONTROL FOR A LEVELLING DEVICE

Filed Feb. 5, 1959

United States Patent Office 3,061,330
Patented Oct. 30, 1962

3,061,330
A CONTROL FOR A LEVELLING DEVICE
Giuseppe Alfieri, Milan, Italy, assignor to Fabbrica Italiana Magneti Marelli S.p.A., Milan, Italy, a company of Italy
Filed Feb. 5, 1959, Ser. No. 791,418
Claims priority, application Italy Feb. 19, 1958
5 Claims. (Cl. 280—124)

The present invention relates to electropneumatic devices for the activating and deactivating of levelling devices in pneumatic suspensions such as particularly employed for vehicles. As known, in levelling devices on vehicles, an external control lever sensitive to variations of load is connected at one end to the wheel-axle of the vehicle, and at its other end to actuating members in the levelling device which is mounted on the frame or body of the vehicle. The elastic members or bellows of the suspension are accommodated between said frame and the wheel-axle.

Consequently, every variation of load on the vehicle causes a corresponding angular stroke of said lever and activation of the levelling device which, by causing the feeding or discharging of said bellows, automatically restores the predetermined initial conditions of level of the frame.

With servo-activated levelling devices, the activation proper of the device does not take place continuously but only under determined conditions such as, for example, at the time of stopping of the vehicle.

The control device according to the invention is a servo-activated levelling device and is characterized in that it limits activation automatically to the period during which the vehicle is at a standstill or at any rate with the engine running at minimum speed; and in that it enables, moreover, actuation by hand, to activate the levelling device independently of the rated running conditions of the engine.

An improvement in the aforesaid electropneumatic circuit consists of making its operation dependent not only on the occurrence of particular running conditions of the vehicle, but also on the pneumatic load (pressure) present in the feeding conduit.

This control of the device is obtained by connecting in series with the energizing coil of the relay an auxiliary switch which provides closing of the circuit of the coil only for values of air pressure equal to or above a predetermined minimum while it keeps it open for lower values. This enables isolating advantageously the pneumatic assembly of the levelling device if the feeding circuit is at a pressure lower than the predetermined one.

A further improvement of the device consists of incorporating with the apparatus some auxiliary elements of the pneumatic circuit such as non-return and safety valves, and subsidiary connections, which enables simplifying considerably the pneumatic circuit from the connections and joints to be eliminated.

In the drawing:

FIG. 1 diagrammatically illustrates an electropneumatic device the operation of which depends on the running conditions of the vehicle in accordance with the invention.

Figure 1A:
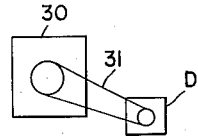

FIG. 1a diagrammatically shows the engine of the vehicle drivingly coupled to the dynamo.

Figure 2:
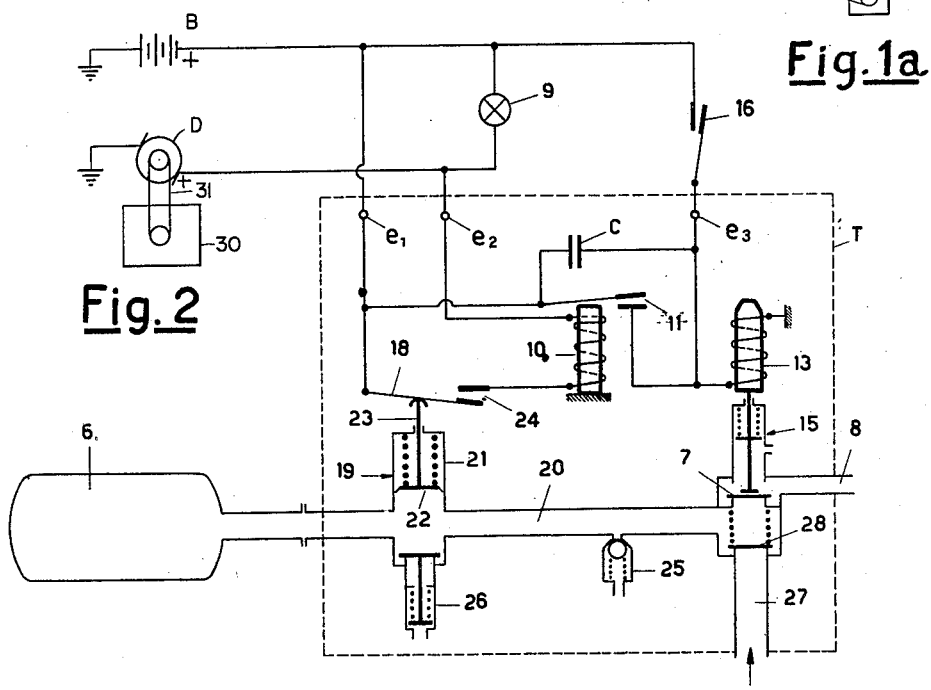

FIG. 2 shows a modification of the device in FIG. 1 such that the operation of the device depends also on the feeding pressure of a pressure fluid.

In a vehicle (not shown) with two axles, 1 and 1a indicate the elastic member or bellows of the pneumatic suspension of the first axle.

Those elements, which are interposed between the wheel axle and the frame of the vehicle, may be connected through the corresponding levelling device 3 or 3a actuated in turn by the external control lever 5 or 5a, with the compressed-air tank of the installation or with the atmosphere for discharge.

Another tank 6 is in communication through the intercepting valve 7 with the conduit 8 feeding the pneumatic mechanism incorporated in the levelling device.

An engine 30 in the vehicle drives the dynamo by belt 31. Accordingly, the dynamo will rotate at a speed proportional to engine speed.

The lamp 9 connected between the positive terminal of the battery +B, and the positive terminal of the dynamo D+, the negative terminals being grounded, is provided for signalling insufficient battery charging voltage. As is known, this signal takes place every time there occurs a reduction of speed of the dynamo.

According to the invention, parallel to the low voltage lamp 9 is connected a relay 10 the energization whereof involves the closure of a contact 11 connected between the positive terminal of the battery (B+) and the terminal 12 of the coil for the energizing of the electrodistributor 13.

The other terminal 14 of the coil of the electrodistributor is connected to ground.

By means of the member 15, according to whether the electrodistributor 13 is energized or not, there is effected the opening of the valve 7 with consequent feeding of said pneumatic mechanism or, as represented in the drawing, discharge to the atmosphere of the fluid flowing back through the conduit 8.

Operation of the device is as follows:

If the dynamo turns normally, the dynamo voltage and that of the battery correspond to each other; consequently, between the positive terminal of the battery B+ and the positive terminal of the dynamo D+ there is no difference of potential and, therefore, in the coil of the relay 10 there does not circulate any current. The switch 11 is open and there is no passage of current in the circuit involving the electrodistributor 13.

Under those conditions the intercepting valve 7 is closed and the levelling devices are in deactivated position.

If the speed of the dynamo is reduced such that the dynamo runs at a speed close to minimum, the battery voltage will be greater than the dynamo voltage. This voltage difference causes lighting of the lamp 9 and the energizing of the relay 10.

On attraction of the armature 17, the contact 11 closes and the electrodistributor 13 is activated which causes opening of the valve 7 to provide communication between the tank and the conduit 8.

The circuit according to the invention is completed by the switch 16 connected between the positive terminal (B+) of the battery and the terminal 12 of the coil of the electrodistributor 13.

By use of the switch 16, the driver can at will energize the electrodistributor 13 and, therefore, put the levelling devices in activation phase independently of the rated or running conditions of the engine.

According to the improvement as illustrated in FIG. 2, in series with the coil of the relay 10 there is connected the switch 18 controlled by the pneumatic device 19 fed by the pneumatic circuit 20 of the levelling devices.

Said pneumatic device is constituted by a cylinder 21 the piston 22 whereof is subjected at one side to the pressure of the conduit 20 and at the other side to the reaction of a spring.

The rod 23 of the piston is connected to the switch 18 which causes by means of the contacts 24, the closure of the energizing circuit of the relay 10 only if the pressure acting upon said piston 22 has attained at least a predetermined minimum value.

In a compressed-air device operating at a pressure of from 15 to 18 kg./cm.$^2$, the closing of the contact 24 might be adjusted for instance for a value of pressure equal to or greater than 8 kg./cm.$^2$.

It is clear that the device, if the other conditions are met, cannot start operation if the value of pressure in the tank and in the connection 20, keeps below 8 atmospheres. As a consequence, the intercepting valve 7 placed between the conduit 20 and the conduit 8 will remain closed until the pneumatic pressure in reservoir 6 and that in conduit 20 is above the predetermined value.

The pneumatic circuit 20 is completed by means of the safety valve 25 and the emergency connection 26 which permits the loading of air in the connection 20 if an auxiliary source is available.

The valve 25 should be gauged, as is known, in relationship with the degree of safety desired. At the pressure of 15 to 18 kg./cm.$^2$ it may be convenient to prepare it for operation at 20 atmospheres.

The connection between the conduit 27 coming from the compressor (not shown) and the circuit 20, is effected through the check valve 28.

It is a feature of the electrodistributor that said auxiliary elements form one body with said device, which essentially permits it to be mounted in situ by means of three electric connections $e_1$, $e_2$, $e_3$ and of three pneumatic connections: that directed to the tank 6, that for the connection to the compressor and the third one directed to the conduit 8 of the levelling devices; it is clear that the conduit 8—in addition to feeding the pneumatic mechanism of activation and deactivation of the levelling devices—can contemporaneously furnish to the levelling devices the air necessary for feeding the bellows of the suspension in case of increase of load on the vehicle.

The electropneumatic device in its whole is confined by casing T.

I claim:

1. A control for a levelling device installed in a vehicle and adapted for levelling said vehicle, said vehicle having an engine adapted for operation at varying speeds, said control comprising: an electrodistributor, means producing a voltage in accordance with the engine speed, a souce of substantially constant voltage coupled to said means with the voltages in bucking relation to produce a voltage resultant whose magnitude depends on the difference between the first said voltages, and means applying said resultant to said electrodistributor to energize the same, said means including a relay comprising engageable contacts and a movable member supporting one of said contacts, said control further comprising a pneumatic system and a piston in said system, said piston being coupled to said movable member and responsive to pressure in said system and a spring acting against the piston in opposition to said pressure, the electrodistributor being operatively associated with the pressure system to control the levelling device in accordance with the energy state of said electrodistributor.

2. A control for a levelling device installed in a vehicle for levelling the same, said vehicle having an engine adapted for operation at varying rotational speed, said control comprising: a battery having a substantially constant voltage output, a dynamo having a voltage output proportional to the engine speed, a first circuit connecting said battery and dynamo in bucking relation, a relay in said circuit, a second circuit including a movable contact, the second circuit being connected to the first circuit and being energized with said battery and dynamo having voltage outputs of different magnitude, said contact being movable by said relay with the same energized to close the second circuit and energize the same, an electrodistributor device in said second circuit, said electrodistributor being energized with said second circuit energized, a manual switch in the second circuit in parallel with said movable contact for energizing said circuit independently of said contact, a pair of engageable contacts in said first circuit, one of said contacts being movable, a movable member supporting said movable contact, said control including a pneumatic system providing a pneumatic medium at a determinable pressure, the movable member being responsive to said determinable pressure to close said contacts and a spring acting against the movable member in opposition to said pressure, a valve in said pneumatic system controlling flow of the pneumatic medium to said levelling device, the electrodistributor being positioned operatively relative to said valve to control the same in accordance with the energy state of the electrodistributor.

3. A control for a levelling device adapted to perform a levelling function in a vehicle, the vehicle having an engine, said control comprising: means producing a voltage in accordance with engine speed, a source of substantially constant voltage coupled to said means in bucking relation to produce a voltage resultant having a magnitude dependent upon the difference between the first said voltages, a source of a pneumatic medium for operating said levelling device, means providing communication between said levelling device and said source, a valve in the latter means interrupting communication between said levelling device and said source, an electrodistributor operatively positioned with respect to said valve for displacing the same and an electromagnetic device responsive to said resultant voltage and operatively coupled to said electrodistributor for energizing the same to displace said valve in accordance with a predetermined magnitude of said voltage resultant whereby the levelling device is in communication with said source only in accordance with engine speed.

4. A control for a levelling device adapted to perform a levelling function in a vehicle, the vehicle having an engine, said control comprising: means producing a voltage in accordance with engine speed, a source of substantially constant voltage coupled to said means in bucking relation to produce a voltage resultant having a magnitude dependent upon the difference between the first said voltages, a source of a pneumatic medium, means providing communication between said levelling device and said source, a valve in the latter means interrupting communication between the levelling device and said source, an electrodistributor operatively positioned in the latter means and adjacent the valve in a first position and providing communication between said levelling device and the atmosphere to exhaust said levelling device and an electromagnetic device operatively associated with the first said means and said source of fixed voltage to receive the voltage resultant therefrom, said electromagnetic device being operatively coupled to said electrodistributor for energizing the same in accordance with a predetermined magnitude of said voltage resultant, said electrodistributor displacing said valve and simultaneously closing communication between the levelling device and the atmosphere with the electrodistributor energized whereby communication between said source and said levelling device is established only with the engine speed at predetermined values.

5. A control for a levelling device adapted to perform a levelling function in a vehicle, the vehicle having an engine, said control comprising a battery having a substantially constant voltage output, a dynamo driven by said engine and having a voltage output related to the engine speed, a first circuit connecting said battery and dynamo in bucking relation, a relay in said circuit, a second circuit including a movable contact, the second circuit being connected to the first circuit and being energized with said battery and dyanmo having voltage outputs of different magnitude, said contact being moved by said relay with the same energized to close the second circuit and energize the same, a source of pneumatic medium, means providing communication between said source and said levelling device, said levelling device being operated by said pneumatic medium to perform said levelling function, a valve in the latter said means normally interrupting communication between said source and the levelling device, and an electrodistributor in said second circuit and energized therewith, said electrodistributor including a movable element positioned adjacent said valve, said movable element being displaced with said electrodistributor energized to open said valve, said movable element extending into said latter means between said levelling device and said valve to provide communication between said levelling device and the atmosphere with the electrodistributor inoperative, said movable element closing communication between said levelling device and the atmosphere with the electrodistributor energized and the movable member displaced.

References Cited in the file of this patent

UNITED STATES PATENTS

| | | |
|---|---|---|
| 2,687,311 | Nallinger | Aug. 24, 1954 |
| 2,706,806 | Johnson | Apr. 19, 1955 |
| 2,787,475 | Jackson | Apr. 2, 1957 |
| 2,820,647 | Jackson | Jan. 21, 1958 |